April 7, 1931.  W. H. WEBSTER  1,799,488

UNIVERSAL COUPLING FOR JACK ACTUATING HANDLES

Filed Dec. 16, 1927

Inventor

Walter H. Webster

By Murray & Zugelter

Attorneys

Patented Apr. 7, 1931

1,799,488

UNITED STATES PATENT OFFICE

WALTER H. WEBSTER, OF CINCINNATI, OHIO, ASSIGNOR TO THE O. P. SCHRIVER COMPANY, OF CINCINNATI, OHIO, A CORPORATION OF OHIO

UNIVERSAL COUPLING FOR JACK-ACTUATING HANDLES

Application filed December 16, 1927. Serial No. 240,518.

This invention relates to a combination flexible and rigid coupling means adapted for imparting rotatory motion to a rotatable screw-jack actuating shaft.

An object of the invention is to provide a jack actuating device which may be conveniently operated at various angles of inclination to a jack drive shaft, or if desired, in rigid alignment therewith.

Another object is to provide a coupling means which is inexpensive of manufacture and simple of operation.

Another object is to provide a coupling means which can not become out of order.

These and other objects are attained by the means described herein and disclosed in the accompanying drawings, in which.

The device comprises a sleeve or coupling member 6 provided with an angular bore 7, one end of which is adapted to receive a rotatable jack drive shaft 9.

Figure 1:
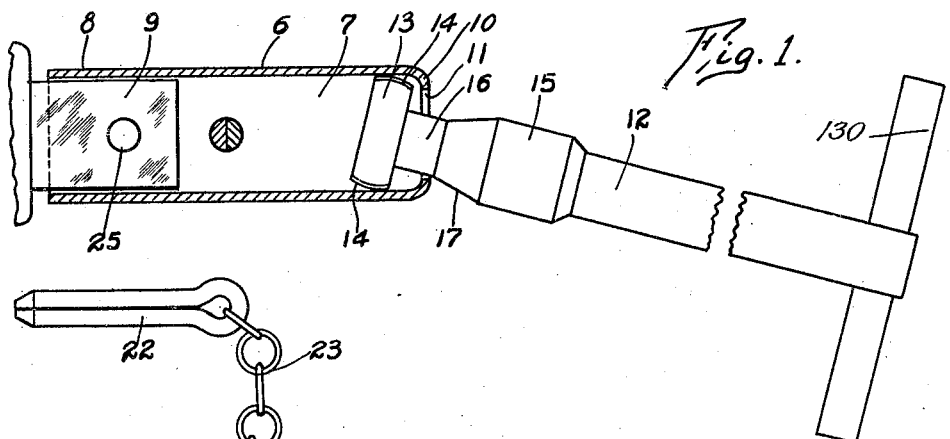
Fig. 1 is a longitudinal, sectional view showing a coupling in flexible driving relation with a rotatable jack handle.

At the opposite end of the coupling member there is provided an inwardly turned peripheral flange 10 forming a reduced opening 11 at the end of the coupling member. A rod 12 is provided on its far end with an actuating handle 130, which may be grasped for imparting rotatory motion to the rod 12. On the opposite end of the rod there is provided an angular driving head 13 which is reciprocally and non-rotatably received in the angular bore 7 of the coupling 9. The driving faces 14 of the driving head may be rounded as shown in Fig. 1 for the purpose of insuring free angular movement of the rod 12 relative to the coupling 6. A bearing portion 15 is provided on the rod 12 for insertion into the reduced opening 11 when it is desired to dispose the rod and sleeve in axial alignment one with the other. The bearing portion 15 is spaced from the driving head by means of an intermediate shank 16 of a size considerably smaller than the reduced opening 11. Tapered shoulders 17 intermediate the shank and the bearing portion provide for easy insertion of the bearing portion into the reduced opening.

Figure 2:
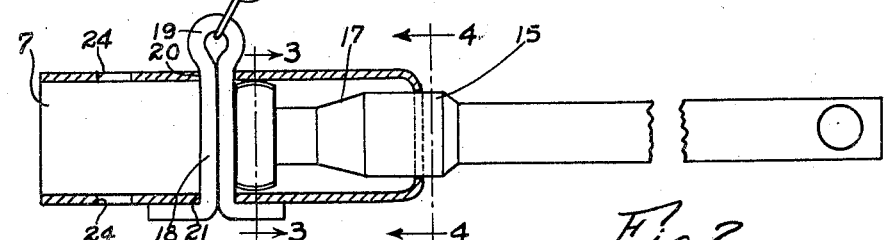
Fig. 2 is a longitudinal, sectional view of the device in which the parts are disposed in rigid alignment.

In Fig. 2 the device is shown in rigid or straight drive condition. It should be noted that to place the device in straight drive condition, it is necessary only to move the rod longitudinally into the sleeve or coupling member, whereupon shoulders 17 guide the bearing portion 15 into the reduced opening. The driving head 13 thereupon abuts a suitable stop means 18 which may be in the form of a comparatively heavy cotter pin 19 received in perforations 20 and 21 in opposed faces of the coupling member. The stop means is disposed transversely of the coupling member 6. Means is also provided for connecting the coupling member to a jack drive shaft 9. The bore 7 is of a size and shape such as to receive therein the jack drive shaft. For retaining the coupling and jack drive shaft in connected relationship, there is provided a second cotter pin 22 which is preferably connected to the first cotter pin 19 by means of a chain or other suitable connecting means 23. The cotter pin 22 is adapted to enter a pair of aligned perforations 24 and a co-operative perforation 25 in the jack drive shaft.

Figure 3:
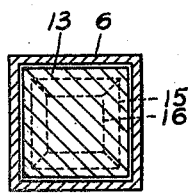
Fig. 3 is a cross sectional view on line 3—3 of Fig. 2.
Figure 4:
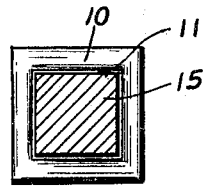
Fig. 4 is a cross sectional view on line 4—4 of Fig. 2.

As shown in Figs. 3 and 4 the coupling, bore, and driving head may be of square material. Obviously, these parts may be of triangular, hexagonal, or other shape if desired. Bearing portion 15 and opening 11 may also be of angular material, although a circular opening and bearing would suffice.

It will be readily understood that any suitable means may be provided for maintaining the jack drive shaft 9 in driving relation with the coupling member or sleeve 6. The ultimate purpose of the said connection is to permit the jack to be withdrawn from, or placed into otherwise inaccessible positions by manipulating the rod 12. It is evident that without the connecting means 22, it would be impossible to withdraw the jack from underneath an automobile or the like, by manipulating the handle 130. When the jack is so withdrawn, the rod 12 is pulled outwardly, placing the driving head 13 in abutment upon the peripheral flange 10 of the coupling, which precludes separation of the parts one from the other. It is to be understood that various changes may be made in the structural details of the coupling device without departing from the spirit of the invention.

What is claimed is:

1. In a device of the class described, the combination of a coupling member having an angular bore, a rotatable rod having an angular driving head reciprocally and non-rotatably mounted in the angular bore of the coupling member, said rod and head being adapted to be disposed in angular driving relation with the coupling member, a bearing portion on the rod adapted to be moved into the bore in the coupling member for effecting axial alignment of the rod and coupling member, means for precluding separation of the rod and coupling member one from the other, and means for connecting the coupling member to a shaft to be driven.

2. In a device of the class described, the combination of a hollow coupling member having connecting means on one end thereof, a rotatable rod having a driving head reciprocally and non-rotatably mounted in the bore of the coupling member, said rod and head being adapted for driving engagement at an angle to one another, a bearing portion on the rod adapted to be moved into the bore of the coupling member for effecting and maintaining axial alignment of the rod and coupling member, and an inwardly turned peripheral flange on the coupling member for precluding separation thereof from the rotatable rod.

3. A combination flexible and rigid drive coupling for transmitting rotary motion, comprising a sleeve having an angular bore, an inwardly projecting flange at one end of the sleeve for reducing the size of the bore at the end of the sleeve, a rod comprising a bearing portion and an angular driving head and having a reduced portion therebetween, said angular head being reciprocally received in the bore of the sleeve and precluded from withdrawal therefrom by the flange, reciprocation of the head and rod serving to successively place the bearing portion of the rod into the reduced bore in the sleeve whereby the head and bearing may support the rod from the sleeve and in axial alignment therewith, and to remove it therefrom for producing a flexible drive means.

4. A combination flexible and rigid drive coupling for transmitting rotary motion, comprising a hollow coupling member, a rod having a driving head non-rotatably mounted in the bore of the coupling member and adapted to be angularly disposed in driving relation to the coupling member, and means on the rod and coupling for positioning and holding the head and coupling member in a non-flexible and axially aligned drive relationship.

5. The combination with a coupling member having an angular bore, of a rod having a driving head reciprocally and non-rotatably mounted in the angular bore, means precluding separation of the head and coupling member, and aligning means for the rod and coupling member rendered effective by reciprocation of the rod and coupling member whereby the rod and coupling member may be either aligned or disposed angularly to one another in constant driving relation.

6. The combination with a coupling member having an angular bore, of a rod having a driving head reciprocally and non-rotatably mounted in the angular bore of the coupling member, said coupling member and head being arranged to preclude separation one from the other, and to cooperate for selective angular and aligned driving relationship.

7. In a jack handle the combination of a rod, a socket non-rotatably mounted thereon, the rod having a reduced portion permitting relatively angular positioning of the socket and a bearing on the rod adjacent the reduced portion for entry into the socket and serving together with the non-rotatably mounted portion of the rod to support said rod entirely from the socket and in alignment therewith.

8. In a device of the class described the combination of a socket member adapted for removable rigid connection to a jack, and an actuating rod having a universal drive connection with the socket and adapted to be moved axially into the socket for support thereby in axial alignment with the socket.

9. In a device of the class described the combination of a socket member adapted for removable rigid connection to a jack, and an actuating rod having a universal drive connection with the socket and adapted to be moved axially relative to the socket for support thereby in axial alignment with the socket.

In testimony whereof, I have hereunto subscribed my name this 14th day of December, 1927.

WALTER H. WEBSTER.